United States Patent [19]
Ishikawa et al.

[11] Patent Number: 5,948,714
[45] Date of Patent: Sep. 7, 1999

[54] SILICON-CARBIDE-BASED INORGANIC FIBER

[75] Inventors: Toshihiro Ishikawa; Yoshikatsu Harada; Yoshiyuki Inoue; Hiroyuki Yamaoka; Mitsuhiko Sato; Masaki Shibuya, all of Ube, Japan

[73] Assignee: Ube Industries, Ltd., Yamaguchi-ken, Japan

[21] Appl. No.: 08/917,081

[22] Filed: Aug. 25, 1997

[30] Foreign Application Priority Data

Aug. 27, 1996 [JP] Japan .................................. 8-225485
Oct. 2, 1996 [JP] Japan .................................. 8-294291
May 26, 1997 [JP] Japan .................................. 9-149874

[51] Int. Cl.$^6$ ...................... C04B 35/565; C04B 35/571
[52] U.S. Cl. ............................... 501/95.1; 501/88; 501/89
[58] Field of Search ............................. 501/88, 89, 95.1, 501/96.2

[56] References Cited

U.S. PATENT DOCUMENTS

| | | | |
|---|---|---|---|
| 4,399,232 | 8/1983 | Yajima et al. | 501/95.1 |
| 4,657,991 | 4/1987 | Takamizawa et al. | 525/477 |
| 4,762,895 | 8/1988 | Chandra et al. | 525/474 |
| 4,945,072 | 7/1990 | Burns et al. | 501/88 |
| 5,032,551 | 7/1991 | Tashiro et al. | 501/95.1 |
| 5,071,600 | 12/1991 | Deleeuw et al. | 501/95.1 |
| 5,229,468 | 7/1993 | Jensen | 501/95.1 |
| 5,268,336 | 12/1993 | Deleeuw et al. | 501/95.1 |
| 5,366,943 | 11/1994 | Lipowitz et al. | 501/95.1 |

FOREIGN PATENT DOCUMENTS 0 367 497  5/1990  European Pat. Off. .
4 110 917  10/1992  Germany .

OTHER PUBLICATIONS

Babonneau et al., *J.A.C.S.*, vol. 74, No. 7, pp. 1725–1728 (1991). no month

*Primary Examiner*—Karl Group
*Attorney, Agent, or Firm*—Wenderoth, Lind & Ponack, L.L.P.

[57] ABSTRACT

A silicon-carbide-based inorganic fiber not only excellent in mechanical properties but also excellent in alkali durability and heat resistance, containing at least 0.1% by weight of a metal atom which is at least one member selected from the group consisting of metals belonging to Groups 2A, 3A and 3B of the periodic table and whose oxide exhibits amphoterism or basicity, having an oxygen content of 17% by weight or less, having an atomic ratio of carbon to silicon (C/Si) in the range of from 1 to 1.7, and having a density of less than 2.7 g/cm$^3$.

12 Claims, 1 Drawing Sheet

SILICON-CARBIDE-BASED INORGANIC FIBER

FIELD OF THE INVENTION

The present invention relates to a silicon-carbide-based inorganic fiber which not only has excellent mechanical properties but also has excellent alkali durability and high heat resistance, and a process for the production thereof.

PRIOR ART

A silicon-carbide-based fiber is used as a reinforcement fiber for plastics or ceramics owing to its excellent heat resistance and mechanical properties. And, many proposals have been already made with regard to silicon-carbide-based inorganic fibers and the process for the production thereof. For example, JP-B-58-38535 discloses a process for producing a silicon carbide fiber, which comprises spinning an organosilicon polymer having a chain formed of silicon and carbon as main components, heating the spun fiber at a low temperature in an oxidizing atmosphere to form an infusible fiber and calcining the formed infusible fiber at a high temperature.

Further, JP-B-62-52051 discloses a silicon-carbide-based inorganic fiber composed of silicon-carbon-titanium-oxygen, and JP-B-58-5286 discloses a process for producing the above silicon-carbide-based inorganic fiber composed of silica on-carbon-titanium-oxygen, which comprises spinning a polytitanocarbosilane obtained by bonding part of silicon atoms of a polycarbosilane to titanium atoms through an oxygen atom, infusibilizing the spun fiber and calcining the infusibilized fiber.

It has been pointed out that the above silicon-carbide-based inorganic fibers are excellent in heat resistance and mechanical properties as described above but are poor in alkali durability. Journal of American Ceramic Society, 78 [7], 1992–96 (1995), describes a method of testing silicon-carbide-based fibers for alkali durability. In this test method, a silicon-carbide-based fiber is immersed in a sodium chloride aqueous solution which is saturated at room temperature, then dried, heat-treated in air at 1,000° C. for 2 hours and then measured for mechanical properties (this method will be referred to as "alkali durability test" hereinafter). The alkali durability test is an acceleration test carried out for testing the durability of a silicon-carbide-based inorganic fiber against NaCl.

The above literature describes the following. When a silicon-carbide-based inorganic fiber is subjected to the alkali durability test, the fiber is extremely decomposed by oxidation, a crystal phase of tridymite is formed on the fiber surface, and the growth of crystal grains of β-SiC is observed in the vicinity thereof, which cause serious adverse effects on the mechanical properties of the fiber.

It is expected that a silicon-carbide-based inorganic fiber is used as a reinforcement fiber in a high-temperature structural material such as an aircraft engine part. When an aircraft flies above the sea, it is necessary to take it into account that Nacl contained in sea water adheres to an engine part, and a sharp decrease in mechanical properties may cause a serious accident. It is therefore a very essential object to improve a silicon carbide inorganic fiber used in the above high-temperature structural material in durability against NaCl.

On the other hand, those inorganic fibers obtained by the methods described in the above publications exhibit excellent tensile strength and elastic modulus in environments at a temperature up to 1,300° C., while the problem thereof is that, when an inorganic fiber is prepared by heat-treating the infusibilized fiber at a high temperature of 1,400° C. or higher, the inorganic fiber tends to show a decreased tensile strength.

The above silicon-carbide-based inorganic fibers contain oxygen, and most of these oxygen atoms have some bonding to silicon atoms in the fiber and are present in the state of silicon oxide. Generally, a silicon-carbide-based inorganic fiber obtained by spinning a precursor such as an organo-silicon polymer and calcining the spun fiber contains carbon in an excess amount over silicon in a non-stoichiometric composition. When the above fiber is decomposed at a high temperature, the above silicon oxide reacts with excess carbon to form CO and SiO. It is considered that the above process mainly causes the above decrease in strength at a high temperature.

In general, a basic oxide is not corroded by a base, while it is corroded by an acid. On the other hand, an acidic oxide or compound is not corroded by an acid, while it is corroded by a base. For example, $SiO_2$, $TiO_2$, SiC, $B_4C$ and $Si_3N_4$ are all weakly acidic and excellent in acid durability, while these compounds are poor in alkali durability. In contrast, $Al_2O_3$ is an amphoteric compound which is relatively well-balanced between acid durability and alkali durability. Further, MgO and $ThO_2$ are weakly basic and excellent in alkali durability, while these compounds are poor in acid durability. BeO and $MgAl_2O_4$ are all strongly basic than $Al_2O_3$, and both of these compounds are excellent in alkali durability. As described above, the acidity or basicity of a material itself is closely related to the corrosion durability against an acid or a base.

The present inventors have found that a silicon-carbide-based inorganic fiber which is poor in alkali durability if taken alone can be far more improved than expected, or remarkably improved, in alkali durability by incorporating a small amount of a metal element of which an oxide shows amphoterism or basicity.

The present inventors have further found the following. When a silicon-carbide-based inorganic fiber contains oxygen and if the oxygen content is 17% by weight or less, the dissociation of the oxygen is prevented at a high temperature of 1,500° C. or higher by incorporating a metal element which can capture part or a major part of oxygen atoms into the fiber in advance, and as a result, an inorganic fiber having remarkably excellent heat resistance can be obtained.

SUMMARY OF THE INVENTION

It is an object of the present invention to provide a silicon-carbide-based inorganic fiber which is not only excellent in mechanical properties but also excellent in alkali durability and heat resistance, and a process for the production thereof.

According to the present invention, there is provided a silicon-carbide-based inorganic fiber containing at least 0.1% by weight of a metal atom which is at least one member selected from the group consisting of metals belonging to Groups 2A, 3A and 3B of the periodic table and whose oxide exhibits amphoterism or basicity, having an oxygen content of 17% by weight or less, having an atomic ratio of carbon to silicon (C/Si) in the range of from 1 to 1.7, and having a density of less than 2.7 g/cm³.

According to the present invention, further, there is provided a process for the production of the above silicon-carbide-based inorganic fiber, which comprises a first step of adding a compound of a metal atom which is at least one member selected from the group consisting of metals belonging to Groups 2A, 3A and 3B of the periodic table and whose oxide exhibits amphoterism or basicity to a polysilane having a molar ratio of carbon atoms to silicon atoms of at least 1.5, and reacting the polysilane with the compound under heat to form a metal-containing organosilicon polymer, a second step of melt-spinning the metal-containing organosilicon polymer to form a spun fiber, a third step of infusibilizing the spun fiber in an oxygen-containing atmosphere at 50 to 170° C. to obtain an infusible fiber, a fourth step of preliminarily heating the infusible fiber in an inert atmosphere to obtain a preliminarily heated fiber, and a fifth step of calcining the preliminarily heated fiber in an inert gas atmosphere or in a reducing gas atmosphere at a high temperature (to form the silicon-carbide-based inorganic fiber).

DETAILED DESCRIPTION OF THE DRAWINGS

Figure 1:
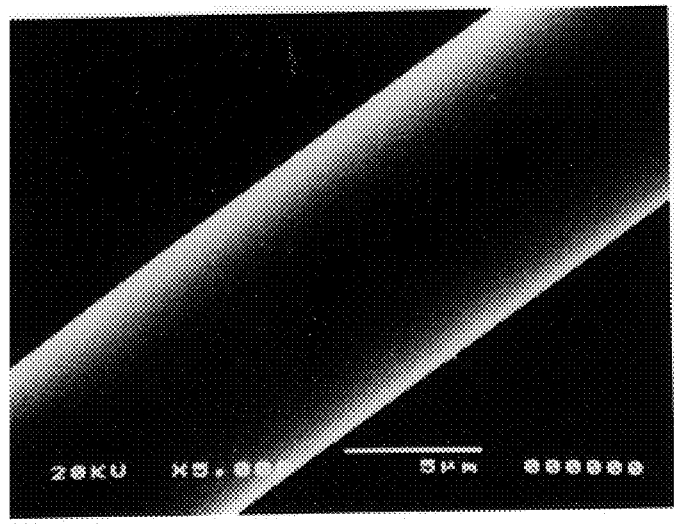
FIG. 1 is a micrograph showing the typical part of a fiber surface of an inorganic fiber which was obtained in Example 1 and tested for alkali durability.

The silicon-carbide-based inorganic fiber of the present invention will be explained first hereinafter.

The silicon-carbide-based inorganic fiber of the present invention is composed of silicon, carbon, metal atom which is selected from the group consisting of metal atoms belonging to Groups 2A, 3A and 3B of the periodic table and whose oxide exhibits amphoterism or basicity, and optionally oxygen. The above silicon-carbide-based inorganic fiber has features in that it contains the above metal, that the ratio of carbon to silicon is in the above-specified range and that it has a density of less than 2.7 g/cm$^2$.

In the present invention, the metal atom whose oxide shows amphoterism or basicity is defined to be as follows. That is, a metal oxide sample is milled to a size of about several tens $\mu$m and the milled sample is dispersed in anhydrous benzene. Neutral Red which has a greatest pKa of conjugate acid among Hammett's indicators is dropwise added to the dispersion. When no color change is observed in this case, a metal of the oxide is taken as a metal whose oxide exhibits amphoterism or basicity. For details of the above testing method, see "Shokubai" (Catalyst) 11 [6] 210–216 (1969).

Specific examples of the metal atom which is selected from the group consisting of metal atoms belonging to Groups 2A, 3A and 3B of the periodic table and whose oxide exhibits amphoterism or basicity include aluminum, magnesium, beryllium, barium, strontium, thorium, yttrium and calcium. The content of the above metal atom in the silicon-carbide-based inorganic fiber is at least 0.1% by weight, preferably at least 0.3% by weight. When the content of the above metal atom is less than 0.1% by weight, the silicon-carbide-based inorganic fiber is not sufficiently improved in alkali durability. The upper limit of the content of the metal atom is not specially limited. However, when the content of the metal atom is extremely large, the silicon-carbide-based inorganic fiber tends to show decreased mechanical properties, and therefore, the upper limit of the metal atom is generally 10% by weight. The above metal atoms may be introduced alone or in combination.

In the silicon-carbide-based inorganic fiber of the present invention, the amount ratio (atomic ratio) of carbon to silicon is required to be in the range of from 1 to 1.7. When the above ratio is less than 1, no fiber having essentially high strength cannot be formed, and the fiber is poor in alkali durability. When the above ratio exceeds 1.7, the fiber is sharply deteriorated by a reaction in which carbon is extracted in air at high temperature, and the fiber is deteriorated and poor in alkali durability.

The silicon-carbide-based inorganic fiber of the present invention sometimes contains boron derived from polyborosiloxane, a boron-containing polymer which may be used in the first step of the production process to be described later. Since, boron causes an adverse effect on the alkali durability of the inorganic fiber of the present invention, the boron content in the inorganic fiber is preferably 0.4% by weight or less.

Preferably, the silicon-carbide-based inorganic fiber of the present invention, which is tested for alkali durability, retains at least 50% of the strength of the silicon-carbide-based inorganic fiber which is not tested for alkali durability. The silicon-carbide-based inorganic fiber of the present invention sometimes contains oxygen, while the content of the oxygen based on the fiber is 17% by weight or less, preferably 15% by weight or less. When the oxygen content exceeds the above upper limit, the amount of oxygen dissociated at 1,400° C. or higher increases, and a β-SiC crystal consequently greatly grows in the fiber, so that the strength retaining ratio at 1,500° C. decreases.

Further, when a metal atom which can strongly capture oxygen is selected as a metal element which is incorporated into the silicon-carbide-based inorganic fiber, the dissociation of oxygen at a high temperature of 1,500° C. or higher is prevented, and therefore, the fiber exhibits not only excellent alkali durability but also excellent heat resistance.

The above metal atom includes aluminum, magnesium, beryllium, barium, strontium, thorium, yttrium and calcium.

The inorganic fiber of the present invention has a strength retaining ratio of at least 50%, preferably at least 70%, after it is heat-treated in argon at 1,500° C.

The process for the production of the silicon-carbide-based inorganic fiber, provided by the present invention, will be explained hereinafter.

First step

In the first step, a metal-containing organosilicon polymer as a precursor polymer is prepared.

The polysilane is a linear or cyclic polymer obtained by dechlorinating at least one dichlorosilane with sodium, for example, by the method described in "Chemistry of Organosilicon Compounds", Kagaku Dojin (1972), and the polysilane generally has a number average molecular weight of 300 to 1,000. The polysilane used in the present invention may have a hydrogen atom, a lower alkyl group, an aryl group, a phenyl group or a silyl group as a side chain to silicon, and in any case, the molar ratio of carbon atoms to silicon atoms is required to be at least 1.5. When this requirement is not satisfied, undesirably, the atomic ratio of carbon to silicon in the silicon-carbide-based inorganic fiber as an end product is not at least 1 in some cases.

The polysilane used in the present invention includes an organosilicon compolymer partially containing a cabosilane bond in place of a polysilane bond unit, obtained by heating the above liner or cyclic polysilane. The organosilicon polymer can be prepared by a known method, for example, by a method in which a linear or cyclic polysilane is allowed to react under heat at a relatively high temperature of 400 to 700° C. or by a method in which a phenyl-group-containing polyborosiloxane is added to the above polysilane and the mixture is allowed to react under heat at a relatively low temperature of 250 to 500° C. The so-obtained organosilicon polymer generally has a number average molecular weight of 1,000 to 5,000.

The phenyl-containing polyborosiloxane can be prepared according to the method described in JP-A-53-42300 or JP-A-53-50299. For example, the phenyl-containing polyborosiloxane can be prepared by the declorinating condensation of boric acid and at least one diorganochlorosiloxane, and it generally has a number average molecular weight of 500 to 10,000. The amount of the polyborosiloxane per 100 parts by weight of the polysilane is generally 15 parts by weight or less. When the amount of the phenyl-group-containing is large to excess, the boron content in the silicon-carbide-basedinorganic fiber as an end product is high, and the inorganic fiber shows a decreased alkali durability. The phenyl-group-containing polyborosiloxane is preferably used in such an amount that the boron content in the inorganic fiber of the present invention is 0.4% by weight or less.

A predetermined amount of an alkoxide compound, an acetylacetoxide compound, a carbonyl compound or a cyclopentadienyl compound of a metal (M) which exhibits amphoterism or basicity as the above oxide is added to the polysilane, and the mixture is allowed to react in an inert gas, generally at a temperature in the range of from 250 to 350° C., for 1 to 10 hours, whereby the metal-containing organosilicon polymer as a raw material can be prepared. The above metal is used in such an amount that the content of the metal in the silicon-carbide-based inorganic fiber as an end product is at least 0.1% by weight. Specifically, one of ordinary skill in the art can properly determine the amount of the above metal according to teachings of the present invention.

The above metal alkoxide is represented, for example, by $M(OR)_n$, in which M is the above metal, R is an alkyl group having 1 to 8 carbon atoms and n is a valence of M. The above metal alkoxide includes ethoxides, butoxides, hexoxides and octoxides of the above metals.

The above metal-containing organosilicon compound is a crosslinked polymer having a structure in which at least part of silicon atoms of the polysilane bonded through or not through a metal atom and an oxygen atom.

Second step

In the second step, a spun fiber of the metal-containing organosilicon polymer is obtained.

The spun fiber can be obtained by spinning the metal-containing organosilicon polymer as a precursor by a known method such as a melt spinning method or a dry spinning method.

Third step

In the third step, the spun fiber is infusibilized to prepare an infusible fiber. The object of the infusibilization is to form crosslinking points of oxygen atoms among polymer chains constituting the spun fiber so that the infusible fiber is not melted and that adjacent fiber members are not fused to each other by the preliminary heating in the subsequent fourth step.

The gas for constituting the oxygen-containing atmosphere includes air, oxygen and ozone. The temperature for the infusibilization is 50 to 170° C. Although depending upon the infusibilization temperature, the infusibilization time is generally several minutes to 30 hours.

The infusible fiber obtained by the infusibilization of the spun fiber in an oxygen-containing atmosphere contains oxygen captured. For adjusting the oxygen content of the inorganic fiber of the present invention to 17% by weight or less, it is preferred to control the infusibilization conditions such that the oxygen content of the infusible fiber is 14% by weight or less. It is therefore important to employ temperature conditions where a minimum amount of oxygen necessary for preventing the melting and fusing of the fiber in the subsequent fourth step is captured into the fiber. Under the above conditions where the inorganic fiber finally has an oxygen content of 14% by weight or less, there may be employed an infusibilizing method using electron beam or γ ray.

Fourth step

In the fourth step, the infusible fiber is preliminarily heated in an inert atmosphere to prepare a preliminarily heated fiber.

The gas for constituting the inert atmosphere includes nitrogen and argon. The heating temperature is generally 150 to 800° C., and the heating time is several minutes to 20 hours. When the infusible fiber is preliminarily heated in an inert atmosphere, the crosslinking reaction of the polymer constituting the fiber is further proceeded with while preventing the capturing of oxygen into the fiber, and the fiber is further improved in strength while retaining the excellent elongation of the infusible fiber obtained from the precursor polymer, whereby the calcining in the last step can be effectively and stably carried out.

Fifth step

In the fifth step, the preliminarily heated fiber is heat-treated by a continuous method or a batch method in an atmosphere containing an inert gas such as argon or a reducing gas such as hydrogen at a temperature in the range of from 1,000 to 1,700° C., whereby the inorganic fiber of the present invention is obtained.

EXAMPLES

The present invention will be explained with reference to Examples and Comparative Example hereinafter, in which "part" and "%" stand for "part by weight" and "% by weight" unless otherwise specified. The tensile strength and the elastic modulus of an inorganic fiber were measured at a gauge length of 25 mm by a mono-filament method. The strength retaining ratio of an inorganic fiber was determined on the basis of the following equation, Strength retaining ratio $(\%) = (\sigma_t/\sigma_0) \times 100$ in which $\sigma_o$ is an initial strength of an inorganic fiber and $\sigma_t$ is a strength of the inorganic fiber which is heat-treated at 1,500° C. in an argon gas for 1 hour.

Referential Example 1

1,034 Parts by weight of dimethyldichlorosilane was dropwise added to anhydrous xylene containing 400 parts of sodium while the xylene was refluxed under heat under a flow of nitrogen gas, and the mixture was subsequently refluxed under heat for 10 hours to form a precipitate. The precipitate was recovered by filtration, and washed with methanol and then with water to give 420 parts of a white polydimethylsilane.

Referential Example 2

750 Parts of diphenyldichlorosilane and 124 parts of boric acid were heated in n-butyl ether at 100 to 120° C. in a nitrogen gas atmosphere, and a formed resinous substance was further heated under vacuum at 400° C. for 1 hour, to give 530 parts of a phenyl-group-containing polyborosiloxane.

Example 1

10 Parts of the phenyl-group-containing polyborosiloxane obtained in Referential Example 2 was added to 100 parts of the polydimethylsilane obtained in Referential Example 1, and these were thermally condensed at 350° C. in a nitrogen gas atmosphere, to obtain an organosilicon polymer having a carbosilane unit:siloxane unit ratio of 100:0.93. In the organosilicon polymer, the molar ratio of carbon atoms to silicon atoms was 2.05.

To a solution of 100 parts by weight of the above organosilicon polymer in xylene was added 16 parts of aluminum tributoxide, and the mixture was allowed to react in a crosslinking reaction at 320° C. in a nitrogen gas flow, to obtain a polyaluminocarbosilane.

The above polyaluminocarbosilane was melt-spun at 240° C. to form a fiber, and the fiber was infusibilized by heat-treating it in air at 150° C. for 1 hour. The infusible fiber had an oxygen content of 5.8% by weight. The infusible fiber was further heated in nitrogen at 320° C. for 10 hours, to obtain a preliminarily heated fiber.

The above preliminarily heated fiber was heat-treated in nitrogen at 1,300° C. to obtain an inorganic fiber. The so-obtained inorganic fiber had a chemical composition of Si=55.1% by weight, C=35.5% by weight, O=7.95% by weight and Al=1.06% by weight and had an Si:C:O:Al atomic ratio of 1:1.50:0.25:0.020. The inorganic fiber had a tensile strength of 305 kg/mm$^2$ and an elastic modulus of 18.5 t/mm$^2$. When the inorganic fiber was heat-treated in argon at 1,500° C. for 1 hour, it showed a strength retaining ratio of 87%.

The above inorganic fiber was subjected to the alkali durability test and then measured for a tensile strength and an elastic modulus to show 192 kg/mm$^2$ and 18.3 t/mm$^2$, and therefore, the inorganic fiber after the alkali durability test retained 63% of the initial strength. FIG. 1 shows a micrograph of the surface of the inorganic fiber which was subjected to the alkali durability test. FIG. 1 shows that the surface retained a remarkably smooth state.

Example 2

8 Parts of aluminum tributoxide was added to a solution of 100 parts of an organosilicon polymer obtained in the same manner as in Example 1 in xylene, and the mixture was allowed to react in a crosslinking reaction under a nitrogen gas flow at 290° C., to obtain a polyaluminocarbosilane.

The above polyaluminocarbosilane was melt-spun at 255° C., and the spun fiber was heat-treated in air at 160° C. for 1 hour, to obtain an infusible fiber. The infusible fiber had an oxygen content of 6.1%. The infusible fiber was heat-treated in nitrogen at 300° C. for 10 hours to obtain a preliminarily heated fiber.

The above preliminarily heated fiber was heat-treated in nitrogen at 1,300° C. to obtain an inorganic fiber. The so-obtained inorganic fiber had a chemical composition of Si=55.2% by weight, C=34.3% by weight, O=9.8% by weight and Al=0.55% by weight and had an Si:C:O:Al atomic ratio of 1:1.45:0.31:0.010. The inorganic fiber had a tensile strength of 325 kg/mm$^2$ and an elastic modulus of 17.2 t/mm$^2$. When the inorganic fiber was heat-treated in argon at 1,500° C. for 1 hour, it showed a strength retaining ratio of 78%.

The above inorganic fiber was subjected to the alkali durability test and then measured for a tensile strength and an elastic modulus to show 182 kg/mm$^2$ and 17.1 t/mm$^2$, and therefore, the inorganic fiber after the alkali durability test retained 56% of the initial strength. The surface of the inorganic fiber after the alkali durability test retained a remarkably smooth state like that in Example 1.

Example 3

16 Parts of magnesium ethoxide was added to a solution of 100 parts of an organosilicon polymer obtained in the same manner as in Example 1 in xylene, and the mixture was allowed to react in a crosslinking reaction under a nitrogen gas flow at 300° C., to obtain a polymagnenocarbosilane.

The above polymagnenocarbosilane was melt-spun at 248° C., and the spun fiber was heat-treated in air at 163° C. for 1 hour, to obtain an infusible fiber. The infusible fiber had an oxygen content of 5.8%. The infusible fiber was heat-treated in nitrogen at 310° C. for 10 hours to obtain a preliminarily heated fiber.

The above preliminarily heated fiber was heat-treated in nitrogen at 1,300° C. to obtain an inorganic fiber. The so-obtained inorganic fiber had a chemical composition of Si=55.9% by weight, C=33.2% by weight, O=10.1% by weight and Mg=0.61% by weight and had an Si:C:O:Mg atomic ratio of 1:1.39:0.32:0.013. The inorganic fiber had a tensile strength of 301 kg/mm$^2$ and an elastic modulus of 16.8 t/mm$^2$. When the inorganic fiber was heat-treated in argon at 1,500° C. for 1 hour, it showed a strength retaining ratio of 73%.

The above inorganic fiber was subjected to the alkali durability test and then measured for a tensile strength and an elastic modulus to show 175 kg/mm$^2$ and 16.3 t/mm$^2$, and therefore, the inorganic fiber after the alkali durability test retained 58% of the initial strength. The surface of the inorganic fiber after the alkali durability test retained a remarkably smooth state like that in Example 1.

Example 4

20 Parts of yttrium acetyl acetonate was added to a solution of 100 parts of an organosilicon polymer obtained in the same manner as in Example 1 in xylene and the mixture was allowed to react in a crosslinking reaction under a nitrogen gas flow at 310° C., to obtain a yttrium-modified polycarbosilane.

The above yttrium-modified polycarbosilane was melt-spun at 253° C., and the spun fiber was heat-treated in air at 155° C. for 1 hour, to obtain an infusible fiber. The infusible fiber had an oxygen content of 6.2%. The infusible fiber was heat-treated in nitrogen at 290° C. for 12 hours to obtain a preliminarily heated fiber.

The above preliminarily heated fiber was heat-treated in nitrogen at 1,300° C. to obtain an inorganic fiber. The so-obtained inorganic fiber had a chemical composition of Si=54.8% by weight, C=33.4% by weight, O=9.8% by weight and Y=2% by weight and had an Si:C:O:Y atomic ratio of 1:1.43:0.31:0.011. The inorganic fiber had a tensile strength of 298 kg/mm$^2$ and an elastic modulus of 17.3 t/mm$^2$. When the inorganic fiber was heat-treated in argon at 1,500° C. for 1 hour, it showed a strength retaining ratio of 79%.

The above inorganic fiber was subjected to the alkali durability test and then measured for a tensile strength and an elastic modulus to show 182 kg/mm$^2$ and 16.9 t/mm$^2$, and therefore, the inorganic fiber after the alkali durability test retained 61% of the initial strength. The surface of the inorganic fiber after the alkali durability test retained a remarkably smooth state like that in Example 1.

Comparative Example 1

10 Parts of the phenyl-group-containing polyborosiloxane obtained in Referential Example 2 was added to 100 parts of the polydimethylsilane obtained in Referential Example 1, and the mixture was thermally condensed in a nitrogen gas atmosphere at 430° C. to obtain an organosilicon polymer having a carbosilane unit:siloxane unit ratio of 100:0.4.

The above organosilicon polymer was melt-spun at 250° C., and the spun fiber was heat-treated in air at 160° C. for 1 hour to obtain an infusible fiber. The infusible fiber was further heated in nitrogen at 300° C. for 10 hours to obtain a preliminarily heated fiber. The preliminarily heated fiber was heat-treated in nitrogen at 1,300° C. to obtain an inorganic fiber. The so-obtained inorganic fiber had a chemical composition of Si=56.0% by weight, C=34.0% by weight and O=10.0% by weight and had an Si:C:O atomic ratio of 1:1.42:0.31. The inorganic fiber had a high tensile strength of 305 kg/mm$^2$ and a high elastic modulus of 17.5 t/mm$^2$. However, after the inorganic fiber was heat-treated in argon at 1,500° C. for 1 hour, it showed a strength retaining ratio of only 10%.

Figure 2:
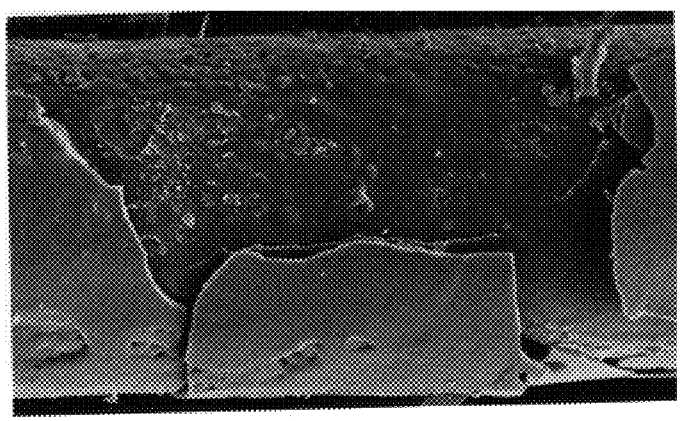
FIG. 2 is a micrograph showing the typical part of a fiber surface of an inorganic fiber which was obtained in Comparative Example 1 and tested for alkali durability.

The above inorganic fiber was subjected to the alkali durability test and the fiber state thereof was observed to show that fiber was in a state where fiber filaments were fused to one another and fragile, and it was not possible to measure the fiber for a fiber strength. After the alkali durability test, the surface of the fiber was extremely corroded as shown in FIG. 2.

Comparative Example 2

1 Part of the phenyl-group-containing polyborosiloxane obtained in Referential Example 2 was added to 100 parts of the polydimethyldilane obtained in Referential Example 1, and the mixture was thermally condensed in a nitrogen gas atmosphere at 380° C. for 10 hours, to give an organosilicon polymer having a number average molecular weight of 1,700. 10 Parts of tetrabutoxytitanium was added to a solution of 100 parts of the above organosilicon polymer in xylene, and the mixture was allowed to react in a crosslinking reaction under a nitrogen gas flow at 320° C. to give a polytitanocarbosilane.

The above polytitanocarbosilane was melt-spun at 225° C. and the spun fiber was heat-treated in air at 170° C. for 1 hour to obtain an infusible fiber. Further, the infusible fiber was heated in nitrogen at 300° C. for 10 hours to obtain a preliminarily heated fiber. The preliminarily heated fiber was heat-treated in nitrogen at 1,300° C. to obtain an inorganic fiber.

The above-obtained inorganic fiber had a chemical composition of Si=54% by weight, C=31% by weight, O=12.6% by weight and Ti=2%, and had an Si:C:O:Ti atomic ratio of 1:1.34:0.41:0.02. The inorganic fiber had a tensile strength of 350 kg/mm$^2$ and an elastic modulus of 17 t/mm$^2$. After the inorganic fiber was heat-treated in argon at 1,500° C. for 1 hour, it showed a strength retaining ratio of only 35%.

Figure 3:
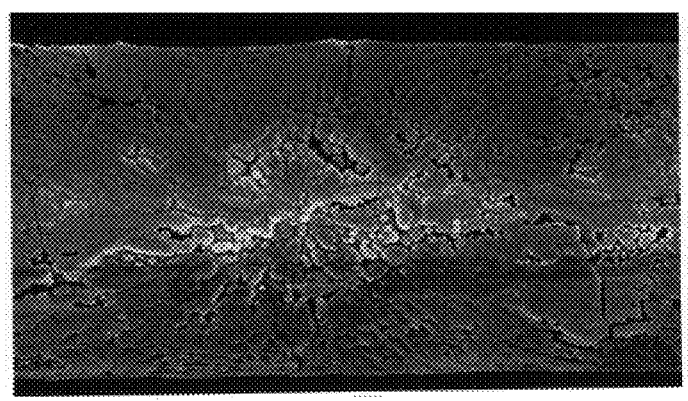
FIG. 3 is a micrograph showing the typical part of a fiber surface of an inorganic fiber which was obtained in Comparative Example 2 and tested for alkali durability.

The above inorganic fiber was subjected to the alkali durability test and the resultant inorganic fiber was so fragile that it was not possible to measure the fiber for a fiber strength. Further, after the alkali durability test, the surface of the fiber was extremely corroded as shown in FIG. 3.

What is claimed is:

1. A silicon-carbide-based inorganic fiber containing at least 0.1% by weight of a metal atom which is at least one member selected from the group consisting of metals belonging to Groups 2A, 3A and 3B of the periodic table and whose oxide exhibits amphoterism or basicity, having an oxygen content of 17% by weight or less, having an atomic ratio of carbon to silicon (C/Si) in the range of from 1 to 1.7, and having a density of less than 2.7 g/cm$^3$.

2. A silicon-carbide-based inorganic fiber according to claim 1, wherein the silicon-carbide-based inorganic fiber has a strength retaining ratio of at least 50% after an alkali durability test in which the fiber is immersed in a sodium chloride aqueous solution which is saturated at room temperature, then dried and heat-treated in air at 1,000° C. for 2 hours.

3. A silicon-carbide-based inorganic fiber according to claim 1, wherein the metal atom is at least one member selected from the group consisting of aluminum, magnesium, beryllium, barium, strontium, thorium, yttrium and calcium.

4. A silicon-carbide-based inorganic fiber according to claim 1, wherein the silicon-carbide-based inorganic fiber has a metal atom content of 0.3 to 10% by weight.

5. A silicon-carbide-based inorganic fiber according to claim 1, wherein the silicon-carbide-based inorganic fiber has a strength retaining ratio of at least 50% after the silicon-carbide-based inorganic fiber is heat-treated in argon at 1,500° C. for 1 hour.

6. A silicon-carbide-based inorganic fiber according to claim 1, wherein the silicon-carbide-based inorganic fiber contains not more than 0.4% by weight of boron.

7. A silicon-carbide-based inorganic fiber containing at least 0.1% by weight of a metal atom which is at least one member selected from the group consisting of metals belonging to Groups 2A, 3A and 3B of the periodic table and whose oxide exhibits amphoterism or basicity, having an oxygen content of 17% by weight or less, having an atomic ratio of carbon to silicon (C/Si) in the range of from 1 to 1.7, and having a density of less than 2.7 g/cm$^3$, produced by the process comprising a first step of adding a compound of a metal atom which is at least one member selected from the group consisting of metals belonging to Groups 2A, 3A and 3B of the periodic table and whose oxide exhibits amphoterism or basicity to a polysilane having a molar ratio of carbon atoms to silicon atoms of at least 1.5, and reacting the polysilane with the compound of a metal under heat to form a metal-containing organosilicon polymer, a second step of melt-spinning the metal-containing organosilicon polymer to form a spun fiber, a third step of infusibilizing the spun fiber in an oxygen-containing atmosphere at 50 to 170° C. to obtain an infusible fiber, a fourth step of preliminarily heating the infusible fiber in an inert atmosphere to obtain a preliminarily heated fiber, and a fifth step of calcining the preliminarily heated fiber in an inert gas atmosphere or in a reducing gas atmosphere at a high temperature.

8. A silicon-carbide-based inorganic fiber according to claim 7, wherein the silicon-carbide-based inorganic fiber has a strength retaining ratio of at least 50% after an alkali durability test in which the fiber is immersed in a sodium chloride aqueous solution which is saturated at room temperature, then dried and heat-treated in air at 1,000° C. for 2 hours.

9. A silicon-carbide based inorganic fiber according to claim 7, wherein the metal atom is at least one member selected from the group consisting of aluminum, magnesium, beryllium, barium, strontium, thorium, yttrium and calcium.

10. A silicon-carbide-based inorganic fiber according to claim 7, wherein the silicon-carbide-based inorganic fiber has a metal atom content of 0.3 to 10% by weight.

11. A silicon-carbide-based inorganic fiber according to claim 7, wherein the silicon-carbide-based inorganic fiber has a strength retaining ratio of at least 50% after the silicon-carbide-based inorganic fiber is heat-treated in argon at 1,500° C. for 1 hour.

12. A silicon-carbide-based inorganic fiber according to claim 7, wherein the silicon-carbide-based inorganic fiber contains not more than 0.4% by weight of boron.

* * * * *